United States Patent [19]
Dugge et al.

[11] Patent Number: 5,178,317
[45] Date of Patent: Jan. 12, 1993

[54] WELDING METHOD FOR PNEUMATIC OUTLET BOTTOM COVER ASSEMBLY

[75] Inventors: Richard H. Dugge, DesPeres; Stephen A. Coughlin, Ballwin; Bob Barnes, St. Charles, all of Mo.

[73] Assignee: ACF Industries, Incorporated, Earth City, Mo.

[21] Appl. No.: 893,415

[22] Filed: Jun. 3, 1992

[51] Int. Cl.$^5$ .................. B23K 31/02; B23K 101/04
[52] U.S. Cl. .................................. 228/165; 228/216; 228/250
[58] Field of Search ............... 228/50, 189, 216, 250, 228/165, 168

[56] References Cited

U.S. PATENT DOCUMENTS

| | | | |
|---|---|---|---|
| 2,792,490 | 5/1957 | Risch et al. | 228/50 X |
| 3,033,145 | 5/1962 | Thielsch | 228/168 X |
| 4,611,830 | 9/1986 | Von Ahrens | 228/250 X |
| 4,652,019 | 3/1987 | Von Ahrens | 228/250 X |

*Primary Examiner*—Kenneth J. Ramsey
*Attorney, Agent, or Firm*—Polster, Lieder, Woodruff & Lucchesi

[57] ABSTRACT

A method of creating a weld joint between two metal members (B1, B2). The members have coincidentally configured abutting edges (E1, E2), first surface (1A, 1B) which are adjacent to and on one side of the edges, and second surfaces (2A, 2B) which are adjacent to and on the other side of the edges. The method includes chamfering the corners of the respective edges and first surfaces to create a generally V-shaped groove (4) between the first surfaces. A gasket (5) of weld filler material is placed between the edges. The gasket is held between the edges and extends both into the groove and outwardly beyond the second surfaces. The groove is next filled with additional weld filler material (7), and the gasket is then melted and fused with this additional material. The portion of the gasket extending outwardly beyond the respective second surfaces is melted and fused with the edges to form a smooth, continuous surface (8) with the second surfaces. Forming of this latter smooth, continuous surface is accomplished without the use of any additional weld filler material.

20 Claims, 2 Drawing Sheets

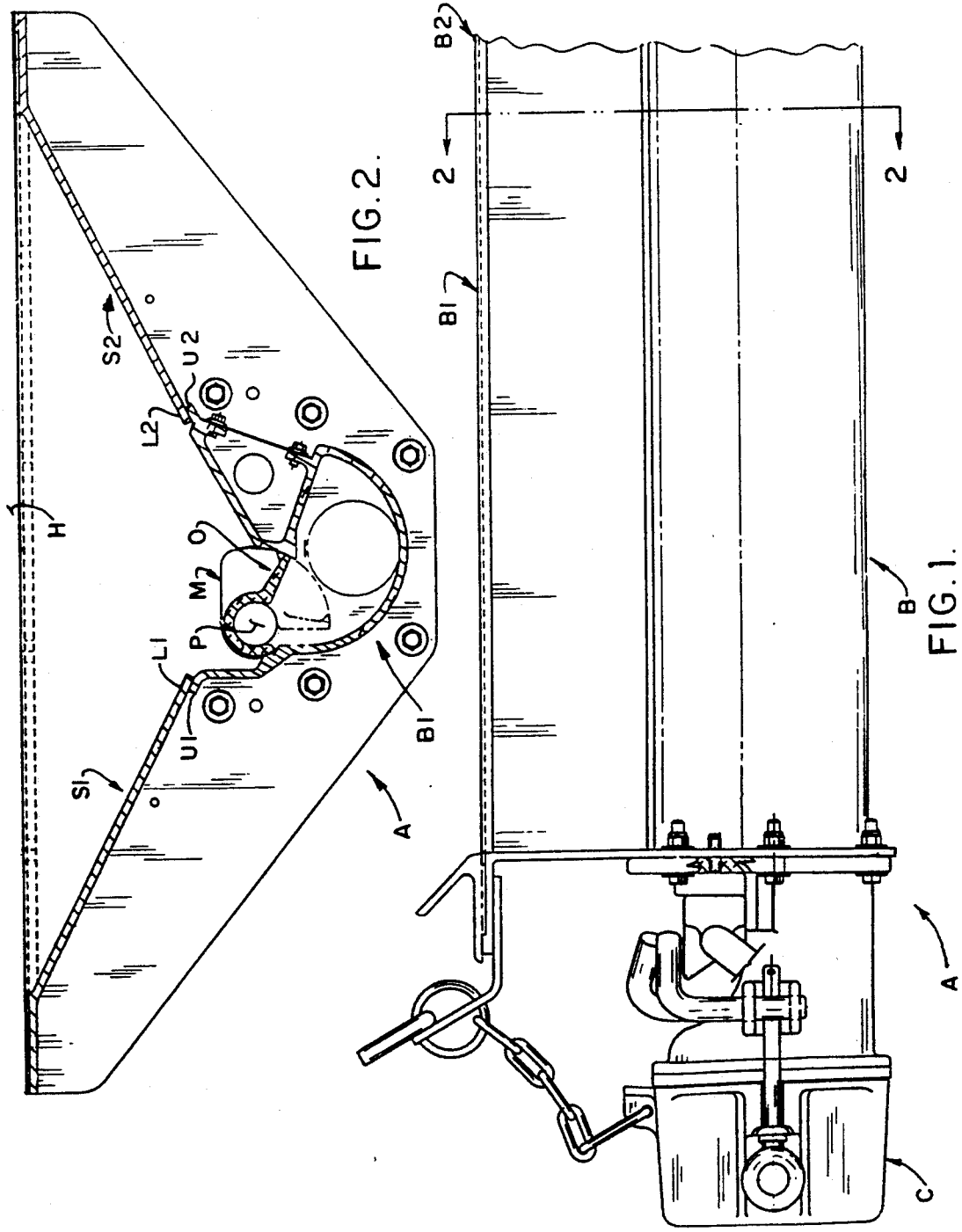

WELDING METHOD FOR PNEUMATIC OUTLET BOTTOM COVER ASSEMBLY

BACKGROUND OF THE INVENTION

This invention relates to railroad car manufacture and, more particularly, to a welding method for manufacturing a bottom cover assembly to the pneumatic outlet of a railroad car.

In the manufacture of pneumatic outlet assemblies for a railway hopper car, one problem encountered is in the fabrication of a bottom valve cover assembly for the outlet. Assembly of the cover requires that two or more longitudinal sections be joined together. Typically this is done by welding adjacent sections together, this welding operation including both an internal and an external weld. The sections comprising the bottom valve cover are generally tubular in shape. Consequently, forming the cover may be thought of as joining together sections of pipe. As is well known in the art, it is sometimes necessary during a welding operation to use inserts in the form of gaskets, for example. The inserts, in turn, may be either wholly or partially consumable.

Most consumable, or partially consumable, inserts are used in joining pipe where welding access to the inside of the pipe is extremely difficult. Examples of welding inserts are shown, for example, in U.S. Pat. Nos. 4,611,830, and 4,652,019. Inserts like those shown in these patents are used to minimize obstructions on the inside surface of a pipe. Here, obstructions are harmful in two ways. First, obstructions inhibit the efficient discharge of lading from a hopper car. Second, obstructions can cause some lading to be retained within the outlet. This lading can then contaminate subsequent ladings shipped in the same car. For certain ladings, any contamination essentially ruins the value of the lading. Hence, there may be a significant economic impact to the owner or lessor of the car resulting from the construction of the cover assembly.

Again with respect to inserts, while they are formed to minimize obstructions on the inside surface of a pipe, it is extremely difficult to achieve a substantially perfectly smooth inner surface at the weld joint between sections. The present invention involves a method of utilizing a fully consumable welding filler metal insert. The method includes use of the insert where welding access to the inside surface of the parts to be joined is limited but not fully obstructed. In these circumstances, access by a TIG welding torch to the inside of the weld joint is possible. However, access to the inside of the joint by a MIG welding torch, and the conventional filler wire fed thereto, is severely limited.

SUMMARY OF THE INVENTION

It is therefore an object of the present invention to provide a method for welding together two metal parts. In particular, the welding method disclosed herein is useful in fabrication of a bottom valve cover assembly for a pneumatic outlet of a railway hopper car.

A further object of the invention is to provide a welding method in which the parts are shaped to provide easy access for welding the outside surfaces of a weld joint between the parts, regardless of how limited is the access for welding the inside surface of the joint.

Another object of the invention is to provide a method for welding together two metal parts using a filler gasket of a weld filler material, with additional weld filler material being used on outside surfaces of the parts.

A still further object of the invention is to provide a method which produces an eighty to ninety percent (80%–90%) penetration on an outside weld pass, and a one-hundred percent (100%) penetration and a substantially smooth inner surface on an inside weld pass. This latter object is achieved without the use of additional filler material.

Yet another object of the invention is to provide such a method for use in the manufacture of outlet assemblies for railroad cars to facilitate attachment of a bottom cover assembly to a pneumatic outlet.

In accordance with the invention, generally stated, a method is provided for creating a weld joint between two metal members such as sections of a railway hopper car bottom valve cover assembly for a pneumatic outlet. The members have generally coincidentally configured abutting edges, generally coincident first surfaces which are adjacent to and on one side of the edges, and generally coincident second surfaces which are adjacent to and on the other side of the edges. The method includes chamfering the corners of the respective edges and first surfaces to create a generally V-shaped groove between the first surfaces. A gasket of weld filler material is placed between the edges. The gasket is held between the edges and extends both into the groove and outwardly beyond the second surfaces. The groove is filled with additional weld filler material, and the gasket is then melted and fused with this additional material. The portion of the gasket extending outwardly beyond the respective second surfaces is melted and fused with the edges to form a smooth, continuous surface with the second surfaces. Forming of this latter smooth, continuous surface is accomplished without the use of any additional weld filler material. Other objects and features will be in part apparent and in part pointed out hereinafter.

BRIEF DESCRIPTION OF THE DRAWINGS

FIG. 1 is an elevational view of a portion of a pneumatic outlet for a railway hopper car;

FIG. 2 is a sectional view of the outlet taken along line 2—2 in FIG. 1;

Corresponding reference characters indicate corresponding parts throughout the drawings.

DESCRIPTION OF A PREFERRED EMBODIMENT

Figure 6:
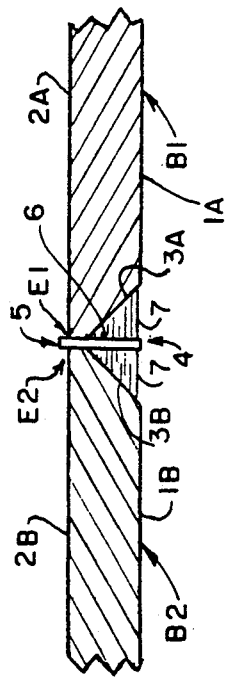

Referring to the drawings, Figs. 1 and 2 illustrate a pneumatic outlet A for a railway hopper car (not shown). The construction and operation of pneumatic outlets are well known in the art and will not be described in detail. In general, the outlet, which mounts beneath a hopper of the railway car, comprises a flow tube B having a cap C at each end closing off the tube. When the caps are removed, and appropriate attachments are made, a flow of air is directed through the outlet. Particulate lading carried in the hopper is entrained in this air flow and the railcar is unloaded. The flow tube is comprised of two or more tubular metal members (B1 and B2 in FIG. 5), which have generally coincidentally configured metal edges or ends E1 and E2 respectively. These edges may be straight, but are preferably rounded. Also preferably, the tubes are formed of aluminum. To form tube B, the abutting ends of the respective members are welded together according to the method to be described hereinafter. The upper ends U1 and U2 of tube B attach to the respective lower ends L1 and L2 of sloping sheets S1 and S2 of the outlet assembly. The upper end of tube B is open as indicated at 0. A valve member M is adjacent this opening and is pivotally mounted at P to move between respective closed and open positions in order to close and open the tube to flow of lading from a hopper H.

Referring to FIGS. 3-6, FIG. 4 provides a profile of one of the tube sections (section B1) at one of its ends. In order to form tube B, abutting ends E1 and E2 of the adjoining tube sections are welded both interiorly and exteriorly as indicated at WI and WE in FIG. 4. The method of the present invention is for creating these weld joints between the two metal members B1 and B2. In addition to their generally coincidentally configured abutting edges, the tubes also have generally coincidental first surfaces 1A and 1B adjacent to and on one side of the edges, and generally coincidental second surfaces 2A and 2B adjacent to and on the other side of the edges.

Figure 5:
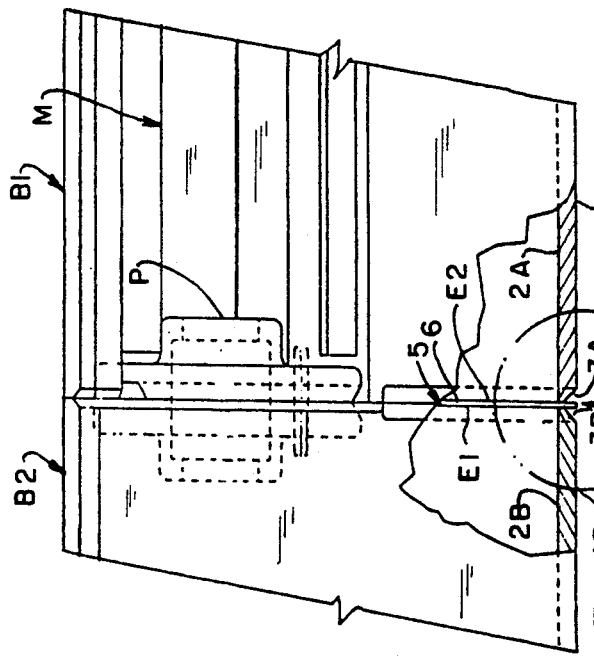
FIG. 5 is a plan view of the cover assembly, partially broken away, and further illustrating the positioning of the gasket; and, FIG. 6 is a sectional view of the assembly taken along line 6—6 in FIG. 5 and showing how adjacent mating surfaces of two sections of the cover assembly are chamfered to facilitate joining of the sections in accordance with the welding method of the present invention.
Figure 3:
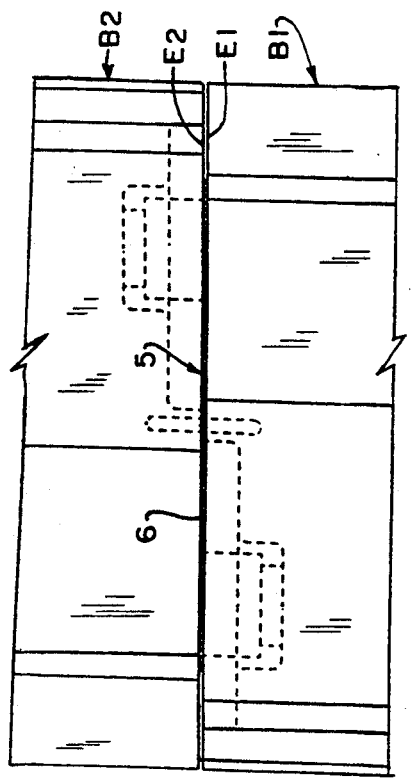
FIG. 3 is a plan view of a section of a bottom cover assembly for the outlet.

The first step in practicing the method of the present invention is to chamfer the corners of the respective edges and first surfaces as indicated at 3A and 3B in FIGS. 5 and 6. As shown, the result of this chamfering step is to create a generally V-shaped groove 4 between the respective first surfaces 1A and 1B. The chamfer at each of the edges is formed so as to create the depth of groove 4, this depth being approximately 75% the thickness of tubes B1 and B2. Additionally, the depth of groove 4 is approximately equal to one-half the width thereof, prior to a gasket 5 being placed between the abutting edges of the tubes. The abutting edges E1 and E2 respectively form 90° angles with the second surfaces 2A and 2B; and, the chamfering at the respective corners between the edges and surfaces 1A and 1B form 45° angles with respect to the second surfaces.

Figure 4:
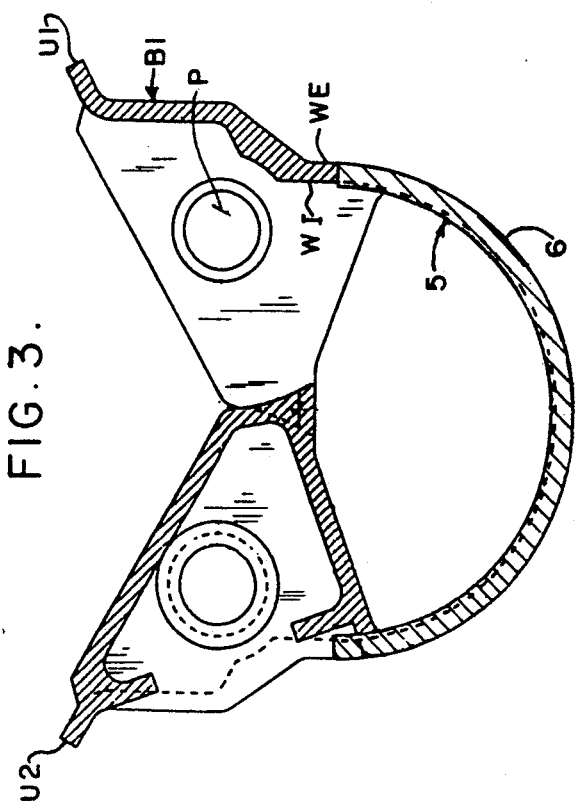
FIG. 4 is an end view of the one section of the cover assembly with a weld gasket positioned over the end.

Next, a gasket 5 of weld filler material is placed between edges E1 and E2. Gasket 5 is also preferably formed of an aluminum material, and is approximately 1/16" (0.16 cm) thick. As shown in FIG. 4, the gasket comprises a curved strip 6 of weld filler material whose curvature generally corresponds to that of the tubes' profiles. The gaskets extends substantially around the perimeter of tubes B1 and B2. The width of strip 6 is greater than the thickness of the tubes; so, as shown in FIGS. 5 and 6, gasket 5 extends outwardly into groove 4 on the outside of the tubes, and inwardly beyond the respective inner surfaces 2A and 2B of the tubes. Preferably, the distance to which the gasket inwardly extends corresponds to the thickness of the gasket, or in this instance, approximately 1/16". Once the gasket is properly positioned, additional weld filler material 7 is deposited into groove 4 to substantially fill it.

After the gasket and weld filler material are in place, a first melting and fusing operation is performed to melt and fuse gasket 5 with the filler material 7. This operation is performed using a MIG welding process, and produces approximately an 80%-90% penetration of the material. As is well-known in the art, a MIG process utilizes a gun (not shown) which feeds metal to the weld zone as the operation is performed. Now, a second melting and fusing operation is performed on the portion of gasket 5 extending inwardly beyond surfaces 2A and 2B. This subsequent operation is performed using a TIG process and produces an approximately 100% penetration with edges E1 and E2. Again as well-known in the art, this latter process involves separately feeding filler metal to the welding zone. The result is the formation of a smooth, continuous surface 8 between the edges and the respective second surfaces 2A and 2B. And, these is is accomplished without the use of additional weld filler material.

It will be understood that in addition to forming valve cover assemblies for pneumatic outlets, the above described method is also usable to assemble other complex structures. Thus, where, as here, the outer surfaces present a convex shape which is relatively easy to weld, but the second, inner surfaces have a concave shape which relatively difficult to weld, the method simplifies fabrication. The method also has operational advantages as well. For example, use of a filler gasket 5 helps prevent cracks at the weld during subsequent use of the structure. Additionally, the creation of a smooth inner surface prevents lading being discharged from a hopper from being caught in a crack or discontinuity. This, in turn, prevents contamination of a subsequent lading by the retained material.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. A method of creating a weld joint between two metal members having generally coincidentally configured abutting edges, said members having generally coincidental first surfaces adjacent to and on one side of said edges, and generally coincidental second surfaces adjacent to and on the other side of said edges, comprising:

chamfering the corners of said edges and said first surfaces to create a generally V-shaped groove between said first surfaces;

placing a gasket of weld filler material between said edges, said gasket being formed and positioned such that it is held between said edges and extends into said groove and outwardly beyond said second surfaces;

filling said groove with additional weld filler material;

melting and fusing said gasket with said additional weld filler material; and, melting and fusing the portion of said gasket extending outwardly beyond said second surfaces with said edges to form a smooth, continuous surface with said second surfaces, forming of said smooth, continuous surface being formed without the use of additional weld filler material.

2. The method of claim 1 wherein the melting and fusing of said gasket with said additional weld filler material in said groove produces approximately an 80%–90% penetration.

3. The method of claim 2 wherein the subsequent melting and fusing of said portion of said gasket extending outwardly beyond said second surfaces produces an approximately 100% penetration.

4. The method of claim 1 wherein said abutting edges form a 90° angle with said second surfaces, and said chamfering at said respective corners between said edges and said first surfaces is formed at a 45° angle from said second surfaces.

5. The method of claim 1 wherein said first mentioned melting and fusing is performed using a MIG process, and said second mentioned melting and fusing is performed with a TIG device without the use of additional filler material.

6. The method of claim 1 wherein said metal members and said gasket are each fabricated of aluminum.

7. The method of claim 6 wherein said gasket is approximately 1/16" (0.16 cm.) thick.

8. The method of claim 1 wherein said chamfer at each of said edges is formed so as to create the depth of said V-shaped groove, the depth of said groove being approximately 75% the thickness of said first and second surfaces.

9. The method of claim 1 wherein said gasket is extended outwardly beyond said second surfaces a distance approximately equal to the thickness of said gasket.

10. The method of claim 1 wherein the depth of said groove is approximately equal to one-half the width thereof, prior to the gasket being placed between said edges.

11. The method of claim 1 wherein said abutting edges are curved edges, and said first surfaces present a convex shape which is relatively easy to weld, and said second surfaces a concave shape which is relatively difficult to weld.

12. A method of creating a weld joint between two extended sections of a railway hopper car bottom valve cover assembly for a pneumatic outlet, said sections having generally coincidentally configured bottom abutting edges, generally coincidental bottom outside surfaces presenting a concave configuration on one side of said edges, and generally coincidental bottom inside surfaces presenting a convex configuration on the other side of said edges, comprising:

chamfering the corners of said edges and said outside surfaces to create a generally V-shaped groove between said outside surfaces;

placing a curved gasket of weld filler material between said edges, said gasket being formed and positioned such that it is held between said edges and extends both into said groove and outwardly of said edges beyond said inside surfaces;

melting and fusing said gasket using additional weld filler material with said edges in said groove; and, melting and fusing the portion of said gasket extending outwardly beyond said second surfaces with said edges to form a smooth, continuous surface with said inside surfaces, this being done without the use of additional weld filler material.

13. The method of claim 12 wherein the melting and fusing of said gasket with said additional weld filler material in said groove produces approximately an 80%–90% penetration.

14. The method of claim 13 wherein the subsequent melting and fusing of said portion of said gasket extending outwardly beyond said inside surfaces produces an approximately 100% penetration.

15. The method of claim 12 wherein said abutting edges form a 90° angle with said inside surfaces, and said chamfering at said respective corners between said edges and said outside surfaces is formed at a 45° angle from said inside surfaces.

16. The method of claim 15 wherein the first said melting and fusing operation is performed using a MIG process, and said second melting and fusing operation is performed with a TIG device without the use of additional filler material.

17. The method of claim 12 wherein said metal members and said gasket are each fabricated of aluminum, and said chamfer at each of said edges is formed so as to create the depth of said groove, the depth of said groove being approximately 75% the thickness of said inside and outside surfaces.

18. The method of claim 17 wherein said gasket is extended outwardly beyond said inside surfaces a distance approximately equal to the thickness of said gasket.

19. The method of claim 18 wherein the depth of said groove is approximately equal to one-half the width thereof, prior to the gasket being placed between said edges.

20. The method of claim 19 wherein said abutting edges are curved edges, and said outside surfaces present a convex shape which is relatively easy to weld, and said inside surfaces a concave shape which relatively difficult to weld.

* * * * *